US009493254B2

(12) United States Patent
Boira Bonhora (10) Patent No.: US 9,493,254 B2
(45) Date of Patent: Nov. 15, 2016

(54) MACHINE AND METHOD FOR FILLING PHARMACEUTICAL PRODUCT CONTAINERS

(71) Applicant: GRIFOLS WORLDWIDE OPERATIONS LIMITED, Dublin (IE)

(72) Inventor: Jordi Boira Bonhora, Barcelona (ES)

(73) Assignee: GRIFOLS, S.A., Barcelona (ES)

( * ) Notice: Subject to any disclaimer, the term of this patent is extended or adjusted under 35 U.S.C. 154(b) by 264 days.

(21) Appl. No.: 14/283,571

(22) Filed: May 21, 2014

(65) Prior Publication Data

US 2015/0034207 A1    Feb. 5, 2015

(30) Foreign Application Priority Data

Jul. 30, 2013  (ES) .................................. 201331177

(51) Int. Cl.
*B65B 3/28* (2006.01)
*A61J 1/05* (2006.01)
(Continued)

(52) U.S. Cl.
CPC .. *B65B 3/28* (2013.01); *A61J 1/05* (2013.01); *B65B 3/003* (2013.01); *B65B 3/24* (2013.01); *G01G 15/04* (2013.01); *G01G 17/00* (2013.01); *B65B 2039/009* (2013.01)

(58) Field of Classification Search
CPC ............ A61J 1/05; B65B 3/003; B65B 3/24; B65B 3/26–3/28; B65B 43/52; G01G 15/02; G01G 15/04; G01G 2015/042–2015/047; G01G 2015/022–2015/027; G01G 17/00–17/06
USPC .......... 141/234, 237, 242, 243, 279, 284, 83
See application file for complete search history.

(56) References Cited

U.S. PATENT DOCUMENTS 594,630 A * 11/1897 Lindsay .............. B01L 3/50273
141/244
648,138 A * 4/1900 Adams et al. ............ B67C 3/16
141/178
(Continued)

FOREIGN PATENT DOCUMENTS

CA          1239207 A       7/1988
DE          10242118 A1    11/2003
(Continued)

OTHER PUBLICATIONS

Spanish Search Report dated Mar. 3, 2014 issued in connection with Spanish Patent Application No. 201331177.

*Primary Examiner* — Timothy L Maust
*Assistant Examiner* — Randall Gruby
(74) *Attorney, Agent, or Firm* — Knobbe Martens Olson and Bear, LLP (57) ABSTRACT

A process for filling pharmaceutical product containers in a container filling machine with the stages of: filling the container with the corresponding pharmaceutical substance through filling means in a filling station of the filling machine, weighing the filled container in a filled container weighing station to confirm that the quantity of pharmaceutical substance with which the container has been filled lies within the desired range, in which when the quantity of pharmaceutical substance with which the container has been filled lies outside the desired range the filling means are moved to the filled container weighing station and the container is topped up with a quantity such that the total substance placed in the container in the two stages lies within the desired range.

11 Claims, 9 Drawing Sheets

(51) Int. Cl.
*B65B 3/00* (2006.01)
*B65B 3/24* (2006.01)
*G01G 15/04* (2006.01)
*G01G 17/00* (2006.01)
*B65B 39/00* (2006.01)

(56) References Cited

U.S. PATENT DOCUMENTS

| | | | | |
|---|---|---|---|---|
| 3,036,604 A * | 5/1962 | Donofrio | B65B 3/32 | 141/169 |
| 3,053,332 A * | 9/1962 | Buchtenkirch | B65B 1/32 | 177/120 |
| 3,269,800 A * | 8/1966 | Lukrec | G01N 35/10 | 141/243 |
| 4,004,620 A * | 1/1977 | Rosen | B65B 57/02 | 141/137 |
| 4,049,031 A * | 9/1977 | Cooper | G01N 1/18 | 141/284 |
| 4,074,507 A * | 2/1978 | Ruf | B65B 1/12 | 141/103 |
| 4,083,389 A * | 4/1978 | Rosen | B67C 7/00 | 141/179 |
| 4,102,367 A * | 7/1978 | Shulman | B28B 13/0275 | 141/231 |
| 4,294,294 A * | 10/1981 | Bennett | B67C 3/007 | 141/179 |
| 4,407,379 A * | 10/1983 | Pryor | G01G 13/04 | 177/103 |
| 4,415,011 A * | 11/1983 | Grant | B65B 3/30 | 141/284 |
| 4,605,047 A * | 8/1986 | Bausch | B65B 3/28 | 141/165 |
| 4,662,409 A * | 5/1987 | Egli | B65B 1/32 | 141/1 |
| 5,105,859 A * | 4/1992 | Bennett | B67C 3/04 | 141/102 |
| 5,148,841 A * | 9/1992 | Graffin | B65B 3/28 | 141/128 |
| 5,168,905 A * | 12/1992 | Phallen | B65B 3/36 | 141/1 |
| 5,287,896 A * | 2/1994 | Graffin | B65B 3/28 | 141/1 |
| 5,328,054 A * | 7/1994 | Hoeberigs | G07F 11/44 | 222/129 |
| 5,806,287 A * | 9/1998 | Trechsel | G01G 15/001 | 177/52 |
| 5,878,796 A * | 3/1999 | Phallen | B65B 43/56 | 141/169 |
| 5,979,512 A * | 11/1999 | McGregor | B65B 1/32 | 141/10 |
| 6,148,877 A * | 11/2000 | Bethke | B65B 3/34 | 141/1 |
| 6,182,718 B1 * | 2/2001 | Seaton | B65B 37/04 | 141/128 |
| 6,397,905 B1 * | 6/2002 | Mayer | B65B 3/26 | 141/188 |
| 6,627,826 B2 * | 9/2003 | Cavina | B65B 43/52 | 141/83 |
| 6,644,364 B1 * | 11/2003 | Feygin | B01J 3/002 | 141/130 |
| 6,708,739 B2 * | 3/2004 | Fabry | B67C 3/30 | 141/231 |
| 6,761,191 B2 * | 7/2004 | Rosen | B67C 3/001 | 134/168 C |
| 6,800,818 B2 * | 10/2004 | Balboni | B65B 3/003 | 141/83 |
| 7,069,964 B1 * | 7/2006 | Kakuda | B65B 3/28 | 141/165 |
| 7,075,019 B2 * | 7/2006 | Bergman | B65B 1/32 | 141/83 |
| 7,322,170 B2 * | 1/2008 | Tomalesky | B65B 7/2835 | 141/129 |
| 7,421,833 B2 * | 9/2008 | Rothbauer | A61J 3/074 | 53/173 |
| 7,503,353 B2 * | 3/2009 | Monte | B65B 1/46 | 141/1 |
| 8,266,874 B2 * | 9/2012 | Runft | A61J 3/074 | 141/83 |
| 8,408,257 B2 * | 4/2013 | Ono | B65B 3/003 | 141/104 |
| 8,601,777 B2 * | 12/2013 | Monti | B65B 3/003 | 53/173 |
| 8,684,162 B2 * | 4/2014 | Cavina | G01G 15/00 | 177/119 |
| 9,021,772 B2 * | 5/2015 | Bedetti | A61J 3/074 | 141/83 |
| 2003/0102169 A1 * | 6/2003 | Balboni | B65B 3/003 | 177/145 |
| 2008/0115462 A1 * | 5/2008 | Doyle | B65B 3/08 | 53/459 |
| 2011/0302884 A1 * | 12/2011 | Monti | B65B 3/003 | 53/281 |
| 2015/0034207 A1 * | 2/2015 | Boira Bonhora | G01G 17/00 | 141/1 |

FOREIGN PATENT DOCUMENTS

| | | |
|---|---|---|
| EP | 0343130 A1 | 11/1989 |
| WO | 2012/055654 A1 | 5/2012 |

* cited by examiner

MACHINE AND METHOD FOR FILLING PHARMACEUTICAL PRODUCT CONTAINERS

CROSS REFERENCE TO RELATED APPLICATION

This application claims priority to and the benefit of Spanish Patent Application No. 201331177, filed on Jul. 30, 2013, which is hereby incorporated by reference in its entirety.

SUMMARY OF THE INVENTION

The present application relates to a machine for filling pharmaceutical product containers and likewise a method for filling the containers.

The pharmaceutical industry uses different types of containers for its products, such as vials, syringes, etc.

Vials are small bottles, normally of glass, used to contain medicinal products or reagents, usually in liquid form.

Pharmaceutical industry standards impose severe safety conditions on the filling of vials with medicinal products. In addition to the requirement for aseptic conditions, the standards also very strictly limit the error in filling with the medicinal product or active ingredient to ensure that patients do not suffer problems as a result of receiving inappropriate excessively high or low doses.

However, known methods and devices for filling with liquid substances do not offer sufficiently great filling accuracy to ensure that 100% of vials filled contain a quantity of substance within the standard range. This implies that there is a need to test the actual quantity filled in all the vials, generally by weighing, and to reject those in which the quantity is outside the standard range, or carry out statistical weighings and reject on whole lots. Because of the high cost and value of the substances handled, and the fact that production is carried out in small lots, this gives rise to a major economic cost.

European Patent document EP 0408822 A2 discloses apparatus for filling containers for medical supplies with a first station where empty vials are weighed, a filling station and a second station in which the filled vials are weighed. All the vials are weighed twice, before and after filling. Those vials which have been filled outside the required range are rejected.

Belgian Patent Document BEA901 407 discloses a method and device for filling containers. The process comprises placing the container in a first weighing station to measure the tare of the container. The container is then transported to a first filling station where the container is filled with a preselected quantity. The container is then transported to a second weighing station. The precise quantity filled is determined by the difference between the two weighings made. The container is finally taken to another filling station in which the container is completely filled. This document provides for four stages which have to be completed (two weighings and two fillings) for every one of the vials, without counting additional weighings for quality control. Two weighing stations and two filling stations are also required. The machine is therefore expensive, and its productivity is seriously low in comparison with the alternative of filling followed by statistical (random) weighing for quality control.

European Patent document EP0343130A1 discloses a method and device for filling containers which comprises placing a container in a first weighing station to measure the tare of the container, transporting the vial to a first filling station in which the vial is filled with a quantity less than the quantity indicated for the vial, and finally the vial is transported to a third simultaneous filling and weighing station in which the vial is filled until an electronic load cell determines a weight corresponding to the weight of a full vial, at which instant filling is stopped. This document offers greater productivity than document BEA901 407, for a similar cost. However filling accuracy is a problem with this embodiment, because of the time between weight determination by the electronic load cell and stopping filling, during which a variable additional quantity of substance continues to enter the vial.

One aspect of the present invention is to provide a machine and method for filling pharmaceutical product containers which overcomes the problem of having to reject vials in which the quantity of substance is outside the range, without significantly increasing the investment costs of the machine while increasing its productivity, that is to say the number of vials filled per unit time.

In some embodiments of the present invention, a method for filling pharmaceutical product containers, preferably vials, in a container filling machine, comprises the stages of:
 weighing an empty container in a filling station; filling the container with the corresponding pharmaceutical substance using filling means in a filling station of the filling machine; and
 weighing the filled container at a filled container weighing station to confirm that the quantity of pharmaceutical substance with which the container has been filled lies within the desired range.

In some embodiments, when, as a consequence of weighing the filled container, the quantity of pharmaceutical substance with which the container has been filled is below the desired range, the filling means are moved to the filled container weighing station and the container is topped up with some amount of the corresponding pharmaceutical substance so that the total substance added to the container in the two stages lies within the desired range.

In some embodiments, the method comprises a prior stage of weighing the empty container.

In some embodiments, the stages of weighing and filling are carried out simultaneously for a plurality of containers, while the topping up stage is carried out only in respect of that or those containers in which the quantity of substance is below the desired range.

Another aspect of the present invention relates to a container filling machine comprising: a) a station for filling containers with a pharmaceutical substance, and b) a station for weighing the filled containers.

In some embodiments, the filling station has container filling means, these means being capable of movement in such a way that they can be moved from the filled container weighing station to top up those vials in which the quantity of substance is below the desired range.

In some embodiments, the machine comprises an empty container weighing station.

In some embodiments, the filling means comprises a filling unit with a plurality of filling nozzles, each filling nozzle being fed by an independent pump.

In some embodiments, the filling nozzles and the pumps are joined together by flexible tubing.

In some embodiments, the filling means comprise a raising member of an inverted U shape, the purpose of which is to impart an ascending/descending path to the part of the tube prior to the filling nozzle.

In some embodiments, the filling station comprises a robotic arm which moves the filling means.

BRIEF DESCRIPTION OF THE DRAWINGS

Drawings of embodiments of the machine and method for filling pharmaceutical product containers to which this invention relates are appended for a better understanding thereof, by way of an explanatory but not limiting example.

DETAILED DESCRIPTION OF THE PREFERRED EMBODIMENT

Figure 1:
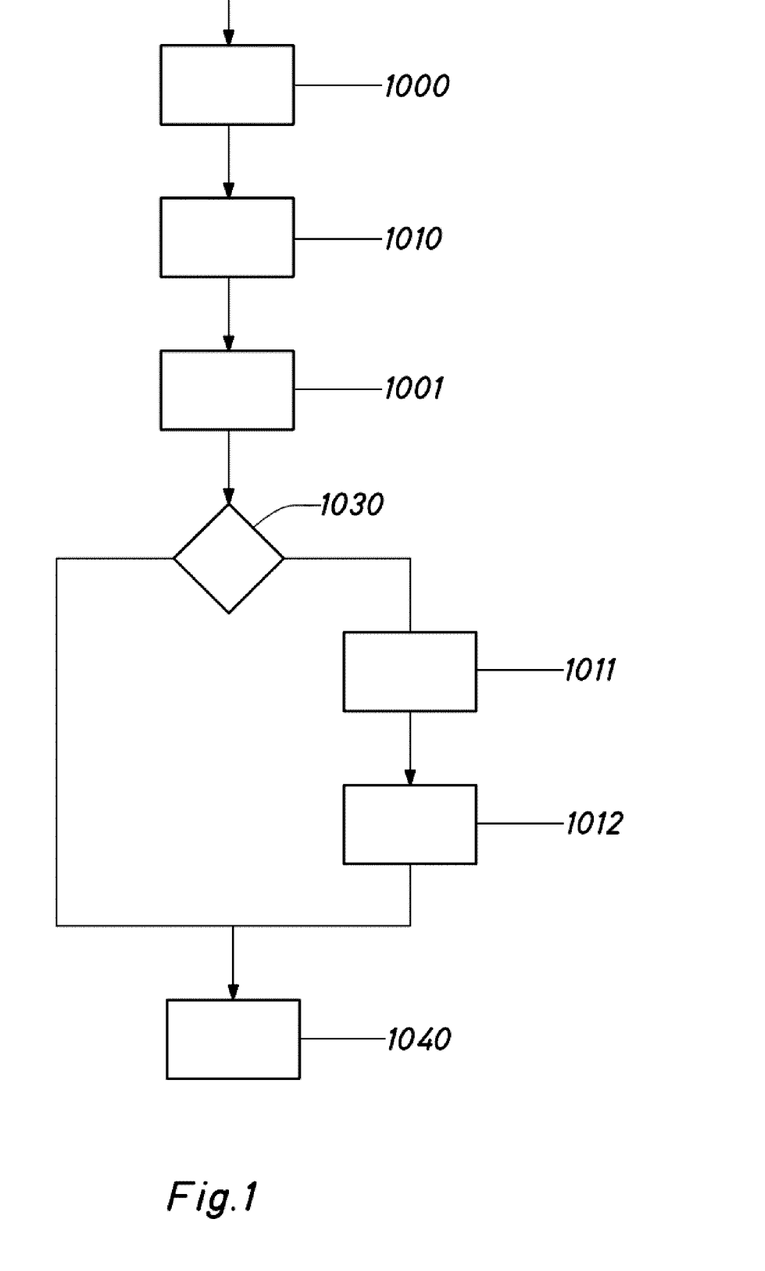
FIG. 1 shows a block diagram of a method according to an embodiment of the present invention.

FIG. 1 shows a block diagram illustrating a process according to an embodiment of the present invention. In the example illustrated in FIG. 1, the method comprises a stage 1000 for weighing empty vials, a second stage 1010 of filling the vials and a third stage 1001 of weighing the filled vials. Once weighing 1001 of the filled vials has been performed it is determined 1030 whether the quantity of substance in each vial lies within the predetermined ranges. If it does then additional tasks 1040 are carried out (such as, for example, sealing, labelling, etc.), if not there then follows a stage 1011 in which the filling means are moved and top up 1012 any vial or vials in which the quantity of substance is not within the desired range.

Figure 2:
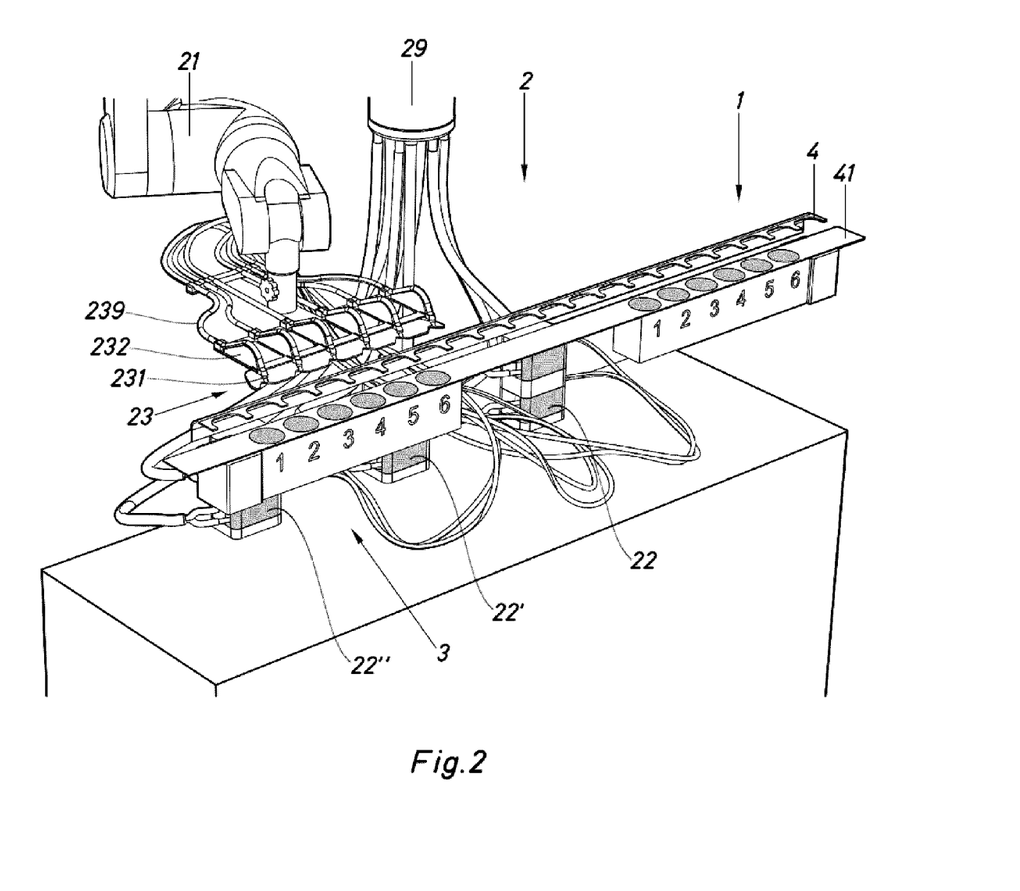
FIG. 2 shows a front perspective view of parts of a machine according to an embodiment of the present invention.
Figure 3:
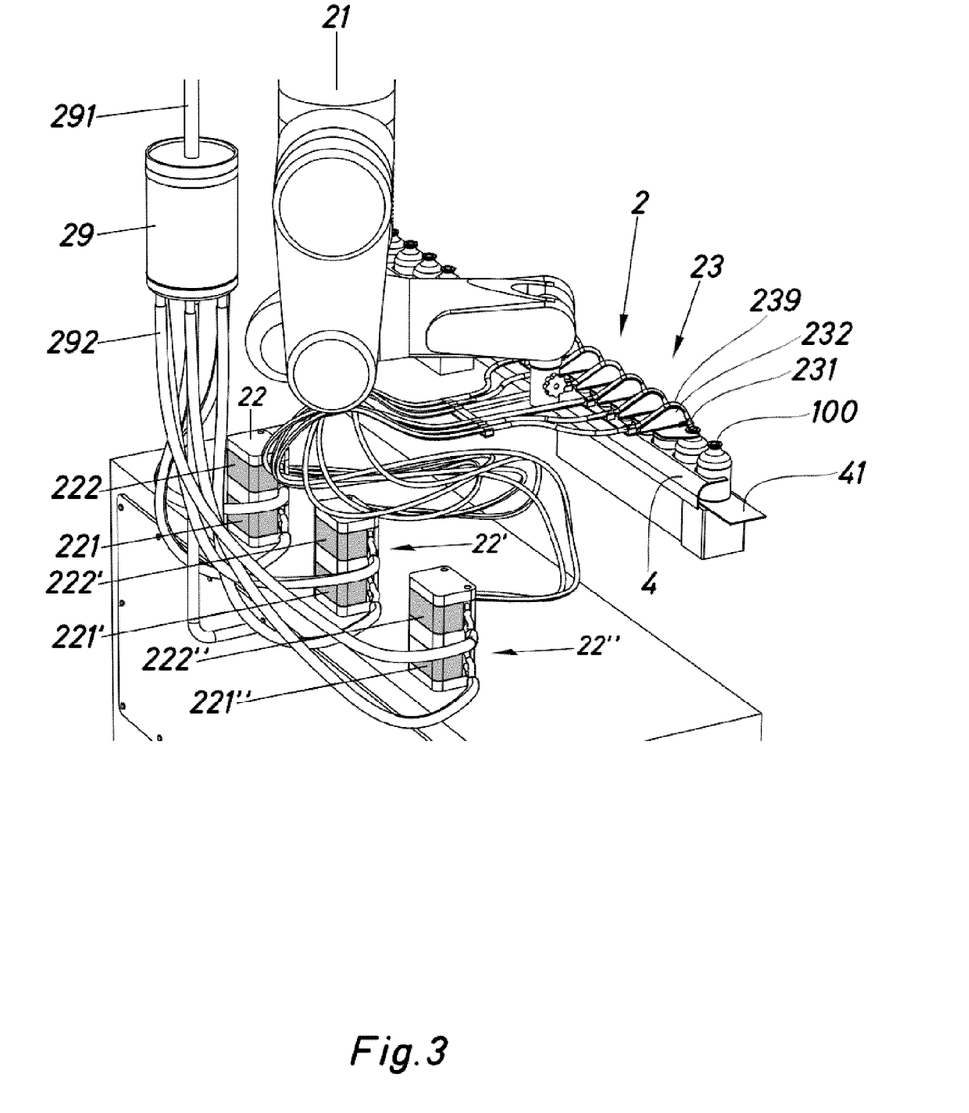
FIG. 3 shows a perspective rear view of parts of a machine according to an embodiment of the present invention.

FIGS. 2 and 3 show the parts of a machine for filling containers (for example, vials for containing a pharmaceutical substance such as a medicinal product in liquid form) which implements the method described in FIG. 1. In the machine shown in FIGS. 2 and 3, a first electronic weighing station 1, a filling station 2 and a second electronic weighing station 3 are located in sequence in the machine on transport means (pusher 4) and positioning means (platform 41). Typically, but not illustrated in the figures, the machine will continue with a vial sealing station. Depending upon the application, the machine may be located within an aseptic room.

The first weighing station 1 can weigh the empty vials to determine their tare. In this way, a machine control device (not shown) can determine the quantity of pharmaceutical substance or medicinal product which has been placed in each vial by comparison with the weight of the filled vial.

As will be seen in FIGS. 2 and 3, the machine in the example is configured for the simultaneous weighing and filling of six vials in each cycle of the machine. In each cycle, pusher 4, mainly comprising a plate with recesses of a shape matching that of vials 100, moves vials 100 linearly and leaves them in a suitable position on supporting platform 41.

The second station is filling station 2 which comprises a robotic arm 21 with a filling unit 23 in which six nozzles 231 for filling pharmaceutical liquid are located, each fed by its corresponding delivery tube 239. In the case mentioned the delivery tube comprises a flexible tube which in all cases is suitable, for example silicone, for the product being treated. The unit comprises a raising member 232 for each delivery tube 239 of inverted V shape, the purpose of which is to provide the tube with an ascending/descending path to the part preceding filling nozzle 231. In addition to this the unit comprises a plate with Vshaped recesses, the purpose of which is to recentre the positions of the vials when the unit approaches them, thus ensuring that the nozzles are centred in the vials' mouths. Each filling nozzle is fed by a specific pump, and in this case has for the purpose six pumps 221, 222, 221', 222', 221", 222". In this case the pumps are of the peristaltic type and are grouped into three groups of two 22, 22', 22". The pumps are fed via flexible tubes 292 leaving distributor 29, which is in turn fed by a single feed tube 291. Robotic arm 21, in this case with six degrees of freedom, has the ability to move between filling station 2 and second filled vial weighing station 3 in such a way that injection unit 23 can be moved to this second filled vial weighing station 3.

Filling nozzles 231 may be specific pieces or merely the ends of tubes.

Second weighing station 3, which may have characteristics similar to the first, in which vials are weighed once they have been filled, is located after filling station 2.

FIGS. 4 to 8 illustrate a method according to an embodiment of the present invention carried out by the machine illustrated in FIGS. 2 and 3. The same identification numbers as in FIGS. 2 and 3 have been retained in FIGS. 4 to 8, and as a result they will not be explained in detail.

Figure 4:
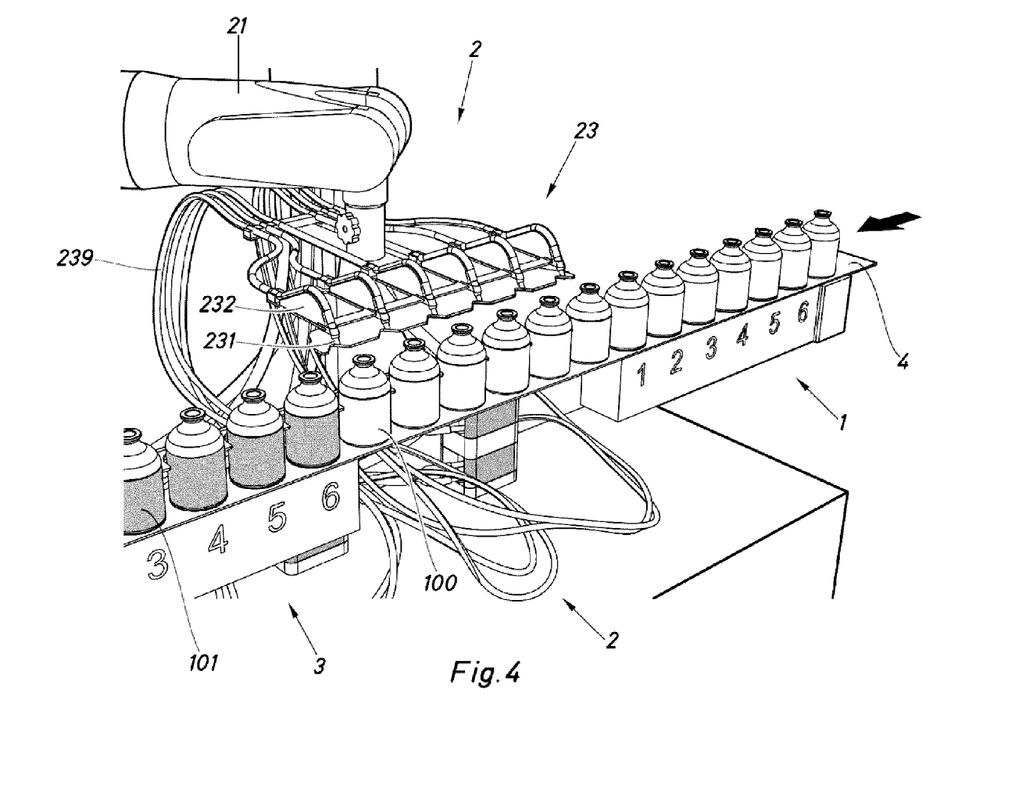
FIG. 4 shows a front perspective view illustrating a first stage of a method according to an embodiment of the present invention.

FIG. 4 shows a moment before empty vials 100 located in filling station 2 are filled. It can also be seen how the vials which have been filled with medicinal product 101 are weighed automatically at second filled vial weighing station 3. As will be seen in the figure, all the vials in second weighing station 3 have been correctly filled. The quantity of medicinal product in each vial is therefore within the standard ranges. Given that the weighing signals from the second filling station lie within what has been preset, the controlling device (not shown) gives the order to fill the empty vials at filling station 2. Simultaneously, an additional lot of empty vials is weighed in first empty vial weighing station 1.

Figure 5:
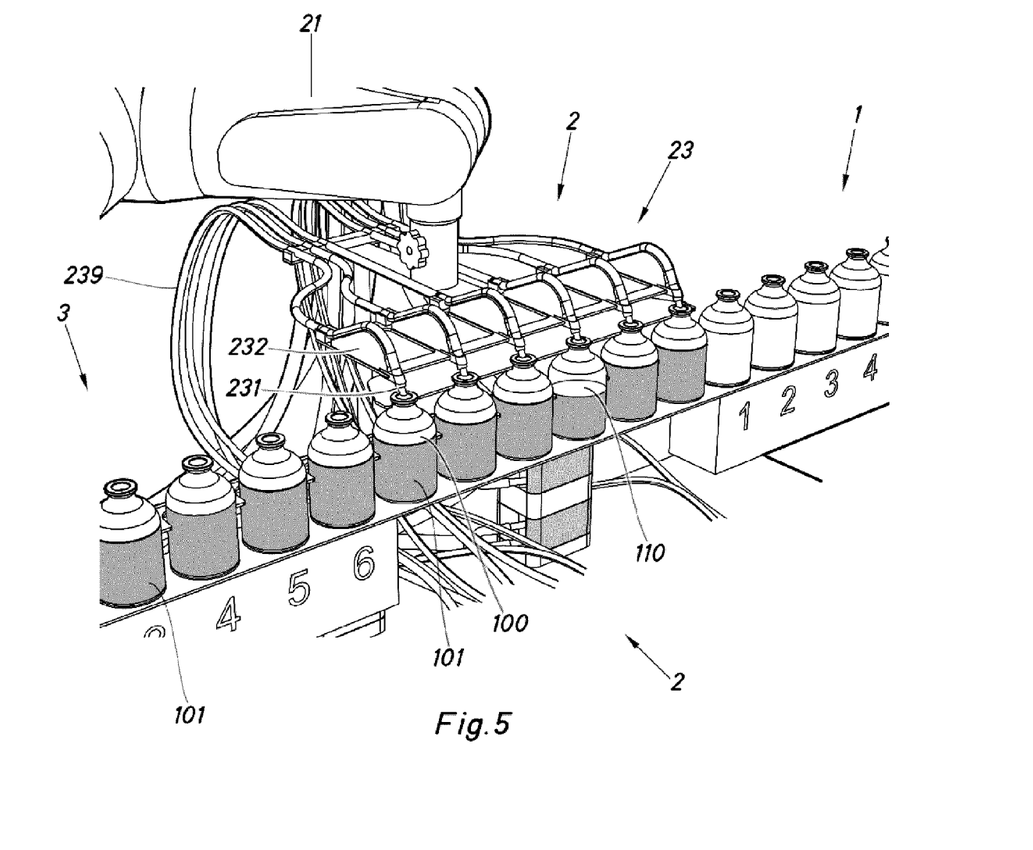
FIG. 5 shows a front perspective view illustrating a second stage of a method according to an embodiment of the present invention.

FIG. 5 shows a moment later. As will be seen, the robotic arm has moved the filling unit 23 in such a way that filling nozzles 231 are located above the mouths of the vials and the peristaltic pumps have been switched on so that vials 100 have been filled with medicinal product 101. However, as will be seen, one vial 110 has received an insufficient quantity of medicinal product (the lack of substance in vial 110 which has been insufficiently filled has been exaggerated for greater clarity). Insufficient filling of a vial may be a normal occurrence because of the intrinsic variability of the process, but it can result in rejection of the vial, with the consequent risks of all kinds.

Figure 6:
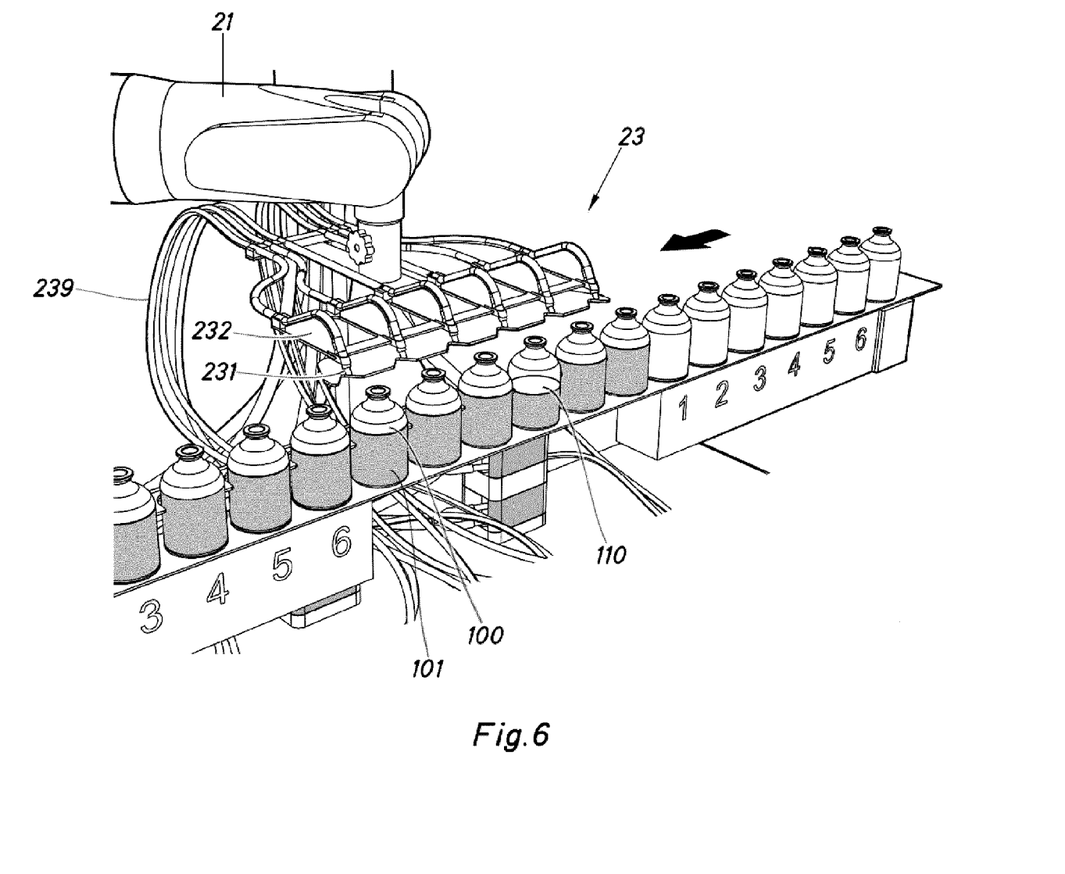
FIG. 6 shows a front perspective view illustrating a third stage of a method according to an embodiment of the present invention.
Figure 7:
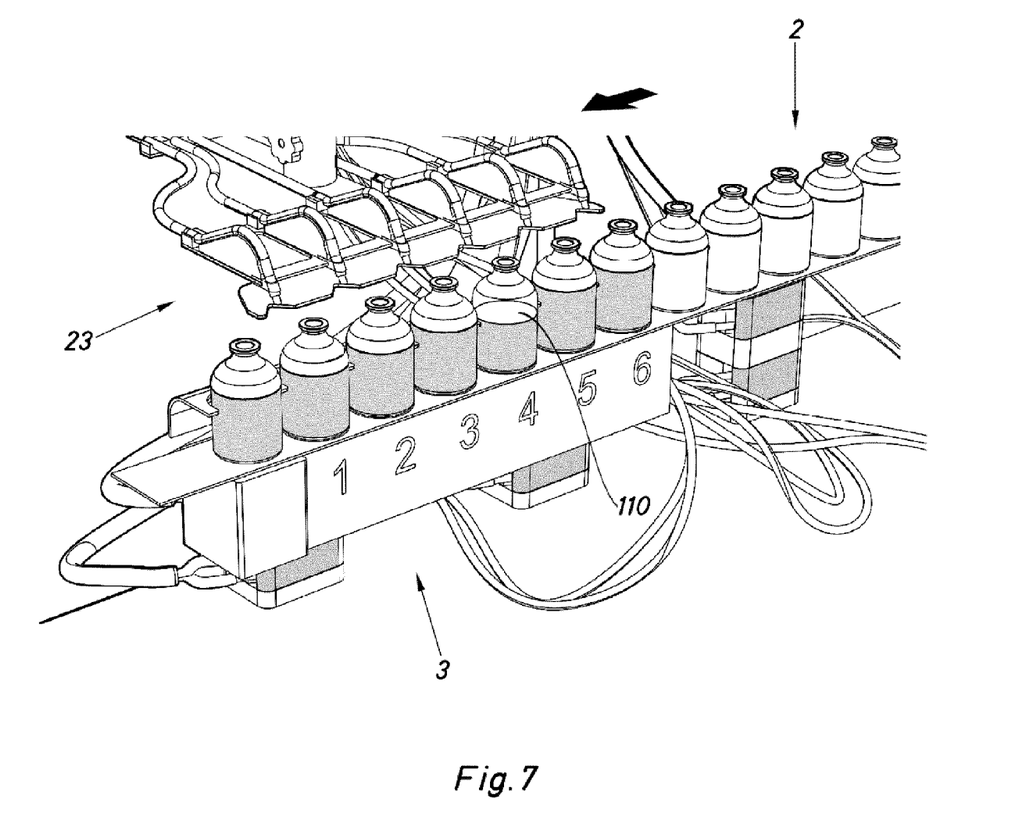
FIG. 7 shows a front perspective view illustrating a fourth stage of a method according to an embodiment of the present invention.
Figure 8:
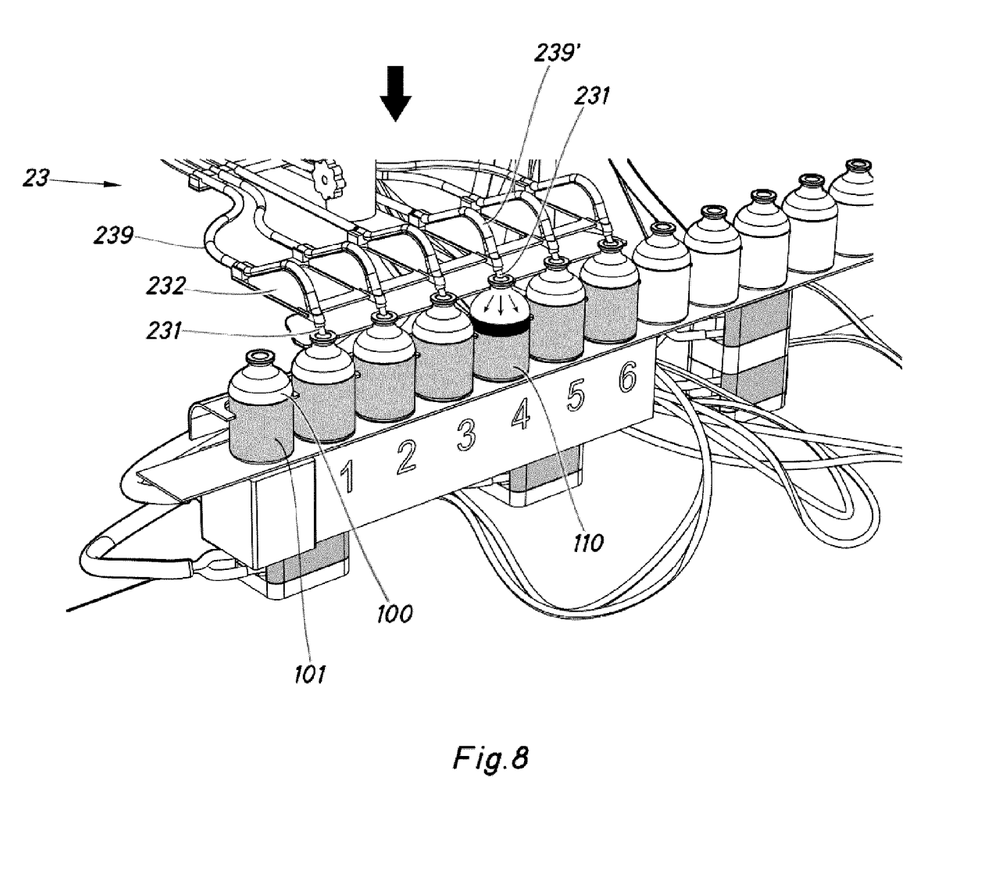
FIG. 8 shows a front perspective view illustrating a fifth stage of a method according to an embodiment of the present invention.

Immediately afterwards, as will be seen in FIGS. 6 and 7, the filling unit 23 withdraws and the lot of filled vials is moved to second weighing station 3. The second filled vial weighing station 3 can detect the lack of weight in vial 110 and the controller can send appropriate commands to robotic arm 21 to move filling unit 23 to second weighing station 3 (see FIG. 7). As will be seen in FIG. 8, once filling unit 23 is located over the filled vials located in the second filling station only vial 110 in which the quantity of medicinal product is insufficient is topped up until the quantity of medicinal product lies within the desired range. This is achieved by activating only the peristaltic pump feeding the corresponding filling nozzle. While filling is taking place the load cell which weighs the vials is in an inactive position. This allows faster filling and prevents the machine from becoming out of calibration as a result of undesired movements of the vial during filling. Subsequently, filling unit 23 returns to its normal position at filling station 2. Of course if no insufficient filling is detected at filled vial weighing station 3, filling unit 23 is not moved to second filling station 3.

Figure 9:
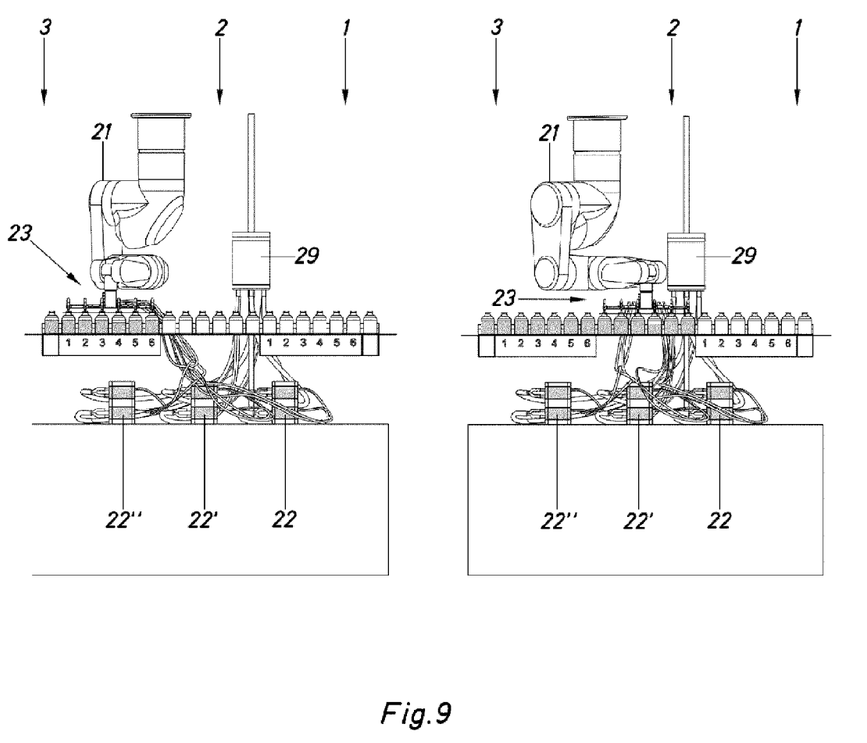
FIG. 9 shows a rear perspective view illustrating the method of FIGS. 4-8 in a summary way.

FIG. 9 shows the moments in the process after vial filling (on the left) from a point of observation at the rear, after the filling unit 23 is moved to second filling station 3. From this point of observations it is possible to see the operation of the robotic arm 21 and how the use of flexible tubes contributes to the ability to move the vial filling means.

Although the present invention has been described in relation to embodiments thereof, these embodiments must not be regarded as restricting the invention, which will be defined by the broadest interpretation of the following claims.

What is claimed is:

1. A method for filling pharmaceutical product containers in a container filling machine, the method comprising:
    placing a set comprising a plurality of containers at a first position corresponding to a first weighing station of the machine;
    simultaneously weighing each of the plurality of containers at the first position using the first weighing station to determine a tare of each container;
    moving the set of containers to a second position;
    filling each of the plurality of containers at the second position with a pharmaceutical substance using a filler of the machine, wherein the filler includes a plurality of nozzles configured to supply pharmaceutical product for individual containers;
    moving the set of containers to a third position corresponding to a second weighing station of the machine;
    simultaneously weighing each of the plurality of containers at the third position using the second weighing station;
    determining for each of the plurality of containers whether its weight at the second weighing station minus its tare is below a predetermined desired range thereby indicating that the container has been insufficiently filled at the second position;
    if it is determined that any container of the set has been insufficiently filled, moving the filler from the second position to the third position corresponding to the second weighing station, and selectively activating a corresponding one of the plurality of nozzles to fill the container that has been insufficiently filled until its weight is within the predetermined desired range.

2. A method according to claim 1, the method further comprising:
    if it is not determined that any of the plurality of containers has been insufficiently filled, retaining the filler at the second position.

3. A method according to claim 1, the method further comprising:
    subsequent to filling at the third position the container that has been insufficiently filled, returning the filler to the second position.

4. A method according to claim 1, wherein the containers are vials.

5. A container filling machine comprising:
    a first weighing station configured to simultaneously weigh a plurality of containers;
    a second weighing station configured to simultaneously weigh a plurality of containers; and
    a movable filler having a plurality nozzles configured to pharmaceutical product for individual containers,
    wherein the container filling machine is configured to:
        place a set comprising a plurality of containers at a first position corresponding to the first weighing station;
        simultaneously weigh each of the plurality of containers at the first position using the first weighing station to determine a tare of each container;
        move the set of containers to a second position;
        fill each of the plurality of containers at the second position with the pharmaceutical substance using the filler;
        move the set of containers to a third position corresponding to the second weighing station;
        simultaneously weigh each of the plurality of containers at the third position using the second weighing station;
        determine for each of the plurality of containers whether its weight at the second weighing station minus its tare is below a predetermined desired range thereby indicating that the container has been insufficiently filled at the second position;
        if it is determined that any container of the set has been insufficiently filled, move the filler from the second position to the third position corresponding to the second weighing station, and selectively activate a corresponding one of the plurality of nozzles to fill the container that has been insufficiently filled until its weight is within the predetermined desired range.

6. A machine according to claim 5, the machine is further configured to:
    if it is not determined that any of the plurality of containers has been insufficiently filled, retain the filler at the second position.

7. A machine according to claim 6, wherein each of the plurality of filling nozzles is fed from an independent pump.

8. A machine according to claim 7, wherein each of the nozzles and the independent pump are joined through flexible tubes.

9. A machine according to claim 5, wherein the machine comprises an inverted U: shaped raising member for providing a tube with an ascending/descending path prior to a filling nozzle.

10. A machine according to claim 5, wherein the machine comprises a robotic arm configured to move the filler.

11. A machine according to claim 5, wherein the containers are vials.

* * * * *